United States Patent
Okada et al.

(10) Patent No.: US 11,815,259 B2
(45) Date of Patent: Nov. 14, 2023

(54) LIGHTING DEVICE

(71) Applicant: Japan Display Inc., Tokyo (JP)

(72) Inventors: Masafumi Okada, Tokyo (JP);
Nobuyuki Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/897,331

(22) Filed: Aug. 29, 2022

(65) Prior Publication Data

US 2023/0076604 A1   Mar. 9, 2023

(30) Foreign Application Priority Data

Sep. 3, 2021 (JP) ................... 2021-143759

(51) Int. Cl.
  *F21V 7/06* (2006.01)
  *G02F 1/29* (2006.01)
  *F21Y 115/10* (2016.01)

(52) U.S. Cl.
  CPC .................. *F21V 7/06* (2013.01); *G02F 1/29* (2013.01); *F21Y 2115/10* (2016.08)

(58) Field of Classification Search
  CPC ........ F21V 7/041; F21V 7/06; G03B 21/2066
  See application file for complete search history.

(56) References Cited

U.S. PATENT DOCUMENTS

| | | | |
|---|---|---|---|
| 2014/0028924 | A1 | 1/2014 | Yamaguchi et al. |
| 2016/0327243 | A1* | 11/2016 | Appelhans ............... F21V 7/09 |
| 2017/0023211 | A1* | 1/2017 | Sepkhanov ............ F21V 5/005 |
| 2018/0217448 | A1* | 8/2018 | Mifune ............. G02F 1/133603 |
| 2018/0217449 | A1* | 8/2018 | Mifune ............. G02F 1/133605 |
| 2020/0386385 | A1* | 12/2020 | Huang .................... F21V 7/045 |
| 2022/0057070 | A1* | 2/2022 | He ......................... F21V 7/0066 |
| 2022/0257813 | A1* | 8/2022 | Ramanand ............. F21V 7/041 |
| 2022/0364689 | A1* | 11/2022 | Kaihatu ................... F21L 4/085 |

FOREIGN PATENT DOCUMENTS

| | | |
|---|---|---|
| JP | 2006-236814 A | 9/2006 |
| JP | 2008-159562 A | 7/2008 |
| JP | 2012-069409 A | 4/2012 |

* cited by examiner

*Primary Examiner* — Christopher E Dunay
(74) *Attorney, Agent, or Firm* — Michael Best & Friedrich LLP

(57) ABSTRACT

The purpose is to provide a rectangle light spot with a simple structure. The invention is: A lighting device having a funnel shaped reflector which includes a neck portion and an opening portion, in which an LED as a light source is disposed at the neck, the opening portion of the funnel shaped reflector is a circle in a plan view, provided a distance from the neck portion to the opening portion along an optical axis is h, and a diameter of the circle is d, h/d is two or larger, and a liquid crystal lens is disposed at the opening.

7 Claims, 32 Drawing Sheets

ON    OFF

LIGHTING DEVICE

CLAIM OF PRIORITY

The present application claims priority from Japanese Patent Application JP 2021-143759 filed on Sep. 3, 2021, the content of which is hereby incorporated by reference into this application.

BACKGROUND OF THE INVENTION

(1) Field of the Invention

The present invention relates to a lighting device especially to the one which is able to form any shapes of light spot or spot sizes.

(2) Description of the Related Art

A spot light is needed in a lighting in the studio or interior lighting to irradiate pictures and so forth. In such cases, there are needs to change a size of the light spot or a shape of the light spot.

Patent document 1 discloses a structure to acquire a pseud rectangular light spot. The shape of the lighting device is a cap shaped and a plan view of emitting surface is circular. The reflecting plates which are set in an inner wall of the cap shaped lighting device are changed for each inner places of the lighting device.

Patent document 2 discloses a structure to acquire a pseud rectangular light spot from a lighting device, which is cylinder in outer shape and has a circular shape at light emitting plane in a plan view. Many concave mirrors including lighting sources in them are disposed in the cylinder, and each of the shapes of concave mirrors are changed to acquire a pseud rectangular light spot.

Patent document 3 discloses a refracting means disposed on a direct type lighting to change a direction of the emitting light. A lens, a prism, a liquid lens, liquid crystal lens and so forth are disclosed as the refracting means.

Patent document 4 discloses structures to utilize liquid crystal lenses to several optical devices.

PRIOR TECHNICAL DOCUMENT

Patent Document

Patent document 1: Japanese patent application laid open No. 2006-236814
Patent document 2: Japanese patent application laid open No. 2008-159562
Patent document 3: Japanese patent application laid open No. 2012-069409
Patent document 4: WO 2012/099127 A1

SUMMARY OF THE INVENTION

As a means to change a shape of light spot, light shading plates can be used other than the structure shown in prior technical documents. The light shading plate changes the lighting area by cutting the light with black absorbing material. Therefore, an energy loss is large in this method. In addition, it takes time and effort to arrange the light shading plates to acquire a proper lighting area.

The purpose of the present invention is to realize a structure that can change a shape or size of the light spot simply and with small energy loss.

The present invention solves the above explained problems; examples of concrete structures of the present invention are as follows.

(1) A lighting device having a funnel shaped reflector which includes a neck portion and an opening portion, in which an LED as a light source is disposed at the neck, the opening portion of the funnel shaped reflector is a circle in a plan view; provided a distance from the neck portion to the opening portion along an optical axis is h, and a diameter of the circle is d, h/d is two or larger, and a liquid crystal lens is disposed at the opening.

(2) A lighting device having a funnel shaped reflector which includes a neck portion and an opening portion, in which an LED as a light source is disposed at the neck, the opening portion of the funnel shaped reflector is a rectangle in a plan view; provided a distance from the neck portion to the opening portion along an optical axis is h, and a length of one side of the rectangle is d, h/d is two or larger, and a liquid crystal lens is disposed at the opening.

(3) A lighting device having: a circular funnel shaped reflector including a first neck portion, a circular opening portion, a first reflecting surface, and a first optical axis; a rectangle funnel shaped reflector including a second neck portion, a rectangle opening portion, a second reflecting surface, and a second optical axis; provided a distance from the first neck portion to the circular opening portion along the first optical axis is h1, and a diameter of the circle is d1, h1/d1 is two or larger; provided a distance from the second neck portion to the rectangle opening portion along the second optical axis is h2, and a length of one side of the rectangle is d2, h2/d2 is two or larger, and the circular funnel shaped reflector and the rectangle funnel shaped reflector are disposed adjacently.

BRIEF DESCRIPTION OF THE DRAWINGS

FIG. 16 is a relation between the shape of the light spot and the illuminance distribution when the lighting device of FIG. 14 is used and the liquid crystal lens is on;

DETAILED DESCRIPTION OF THE PREFERRED EMBODIMENTS

Figure 1:
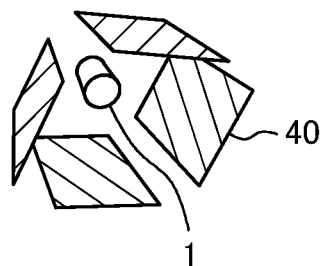
FIG. 1 is a perspective view of a lighting device using light shading plates.
Figure 2:
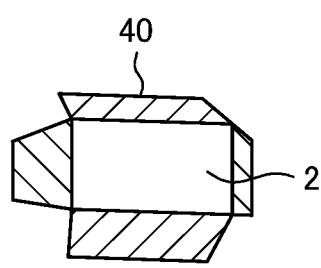
FIG. 2 is a perspective view of a lighting device having a flat light source using the light shading plates.

FIG. 1 is an example which uses light shading plates 40 to change a lighting area or a spot shape of a beam from a light source 1. FIG. 2 is an example which uses light shading plates 40 to change a lighting area or a spot shape of a beam from a flat light source 2. The light shading plate 40 has poor energy efficiency because it uses a black light absorbing material to change the lighting area. In addition, it takes time and effort to arrange the light shading plates to acquire a proper lighting area or a shape of the light spot.

The purpose of the present invention is to solve the above explained problems. The present invention is explained in detail by following embodiments.

Embodiment 1

Figure 3:
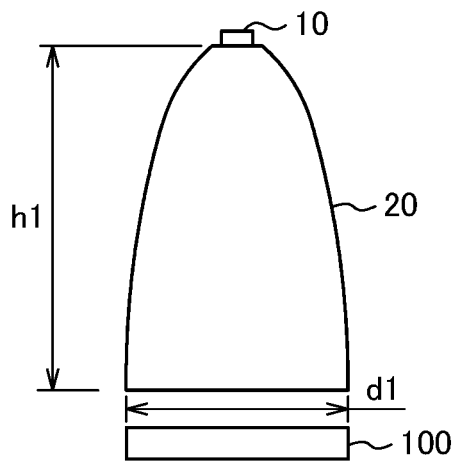
FIG. 3 is a side view of a lighting device according to embodiment 1.
Figure 4:
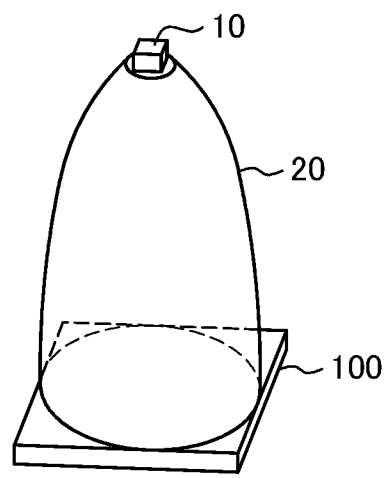
FIG. 4 is a perspective view of the lighting device according to embodiment 1.

FIG. 3 is a side view which shows a fundamental structure of the lighting device according to embodiment 1; and FIG. 4 is a perspective view corresponding to FIG. 3. In FIG. 3, a liquid crystal lens 100 is disposed on the opening of the bell shaped reflector 20. The opening of the bell shaped reflector 20 in FIG. 3 is circle. The LED (Light Emitting Device) 10 is disposed on the top of the bell shaped reflector 20. Herein after, the bell shaped reflector is called as a circular funnel shaped reflector 20. The reason why "circular" is used is to distinguish from a funnel shaped reflector 30 having a rectangular opening, which is explained in embodiment 2.

The reason why the funnel shaped reflector 20 is used is to make the light distribution angle small emitting from the reflector. At least a part of the funnel shaped reflector 20 is paraboloid to direct the light parallel to the optical axis. The liquid crystal lens 100 is disposed at the opening of the funnel shaped reflector 20. The liquid crystal lens 100 has a role to change a diameter of the light spot or change the shape of the light spot. The liquid crystal lens 100 is generally disposed at the opening of the funnel shaped reflector 20; however, in FIG. 3, it is disposed apart from the opening of the funnel shaped reflector for explanation.

In FIG. 3, a height h1 of the funnel shaped reflector 20 is e.g. 30 mm; and the diameter d1 of the opening is e.g. 6.5 mm. The light distribution angle can be made smaller when a ratio h1/d1 is lager, provided h1 is a height of the funnel shaped reflector 20 and d1 is a diameter of the opening. The ratio h1/d1 is 2 or larger, preferably 3 or larger, and further preferably 4 or larger. LED 10 is e.g. a rectangular; one side is approximately 1 mm. In FIG. 3, the 100 is drawn small according to the opening of the diameter d1 of the funnel shaped reflector 20; however, it can be made larger according to a layout of the lighting device. Further as will be explained in embodiment 2, when a plurality of funnel shaped reflectors 20 are arranged side by side, one liquid crystal lens 100 can be disposed in common to a plurality of funnel shaped reflectors 20.

Although the liquid crystal lens 100 generally consists of two sheets of the first liquid crystal lens 100 and the second liquid crystal lens 100, in FIG. 3, however, it is shown as one sheet for simplicity. However, since a thickness of the liquid crystal lens 100 can be made very thin, a thickness of the liquid crystal lens 100 does not give impact to a total thickness of the lighting device.

FIG. 4 is a perspective view of the lighting device of FIG. 3. In FIG. 4, the LCD lens 100 is disposed at the opening of the circular reflector 20. The parallel light is easier to control for the liquid crystal lens 100, that is to say, the light of small light distribution angle is easier to control for the liquid crystal lens 100. Since the emitting light from the circular funnel shaped reflector 20 has a small light distribution angle, it can be precisely controlled by the liquid crystal lens 100.

In FIG. 4, the liquid crystal lens 100 is about the same size as the opening of the circular funnel shaped reflector 20; however, a larger liquid crystal lens 100 is preferable for a more precise control. In other words, the effective area of the liquid crystal lens 100 is preferably larger than the opening of the circular funnel shaped reflector 20.

Figure 5:
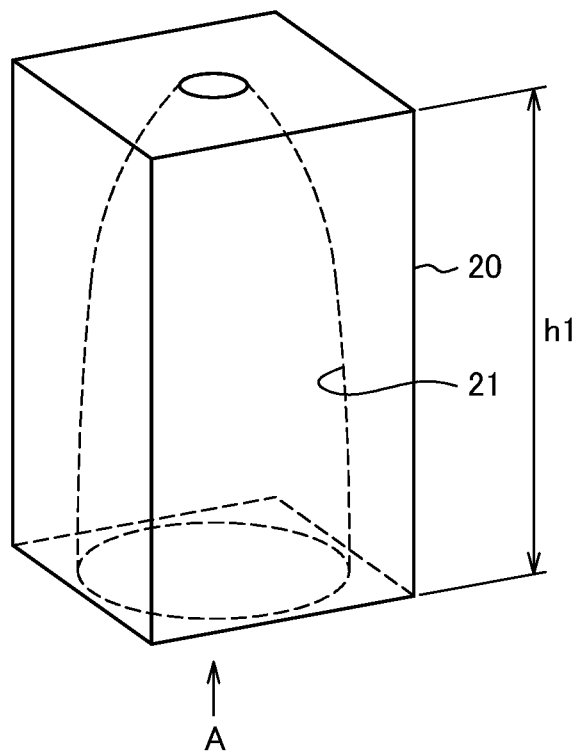
FIG. 5 is a perspective view of a circular funnel shaped reflector.

FIG. 3 and FIG. 4 are models to show a function of the circular funnel shaped reflector 20. That is to say, the circular funnel shaped reflector 20 of FIG. 3 and FIG. 4 shows an inner surface of the reflector. The circular funnel shaped reflector 20 having inner surface of FIG. 3 or FIG. 4 can be formed as e.g. FIG. 5. In FIG. 5, a block of metal having high reflectance as aluminum is provided, then, machining is applied to the block. The broken lines in FIG. 5 show a reflecting surface 21. Alternatively, the circular funnel shaped reflector 20 as FIG. 5 can be formed by die cast.

The circular funnel shaped reflector 20 as FIG. 5 can also be formed by resin. For example, the shape as FIG. 5 is formed by resin with injection molding; after that metal having high reflectance as aluminum or silver is coated on the inner surface by vacuum evaporation, sputtering or plating to form a reflecting surface 21.

Figure 6:
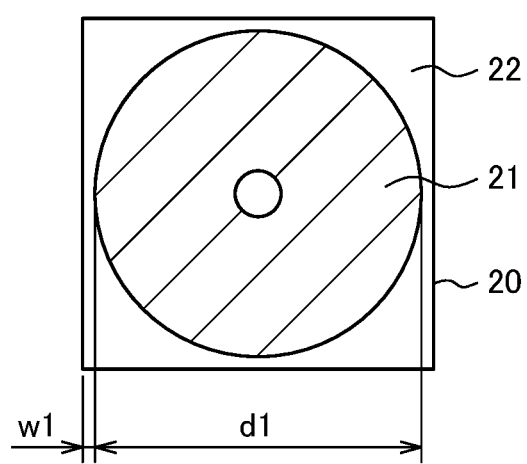
FIG. 6 is a bottom view of the circular funnel shaped reflector.

FIG. 6 is a bottom view which the circular funnel shaped reflector 20 of FIG. 5 is viewed from direction A. In FIG. 6, item 21 is a reflecting surface and item 22 is a bottom surface. If it is formed by metal, a mechanical strength of the circular funnel shaped reflector 20 can be maintained when a width w1 at the bottom of FIG. 6 is approximately 0.2 mm. The shape of FIG. 5 is easy to handle since the outer shape is rectangular. In addition, when a plurality of lighting device as FIG. 5 are used side by side, it is easy to arrange the lighting devices because the outer shape is rectangular.

Figure 7:
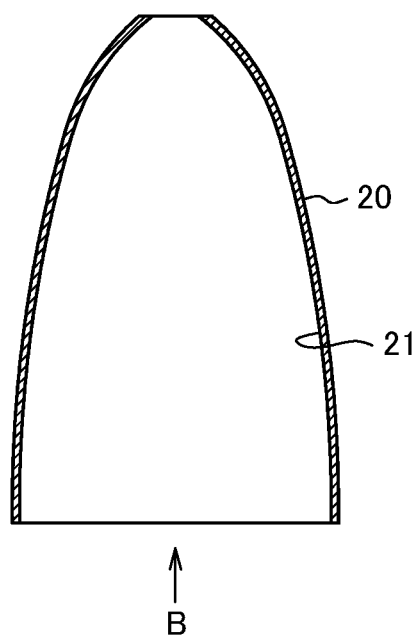
FIG. 7 is a cross sectional view of the circular funnel shaped reflector according to another example of embodiment 1.
Figure 8:
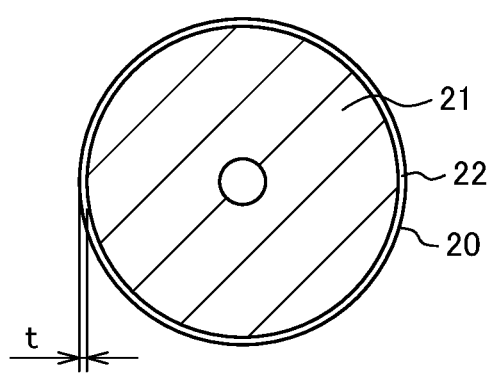
FIG. 8 is a bottom view of FIG. 7.

FIGS. 7 and 8 are examples when the circular funnel shaped reflector 20 of FIGS. 3 and 4 is formed by pressing the metal. FIG. 7 is a cress sectional view and FIG. 8 is a bottom view when FIG. 7 is viewed from direction B. Aluminum is best suitable as metal material since it has a high reflectance. Since the circular funnel shaped reflector 20 has an inner diameter of approximately 6.5 mm and a height of approximately 30 mm, mechanical strength can be maintained if a thickness t is approximately 0.2 mm.

Figure 9:
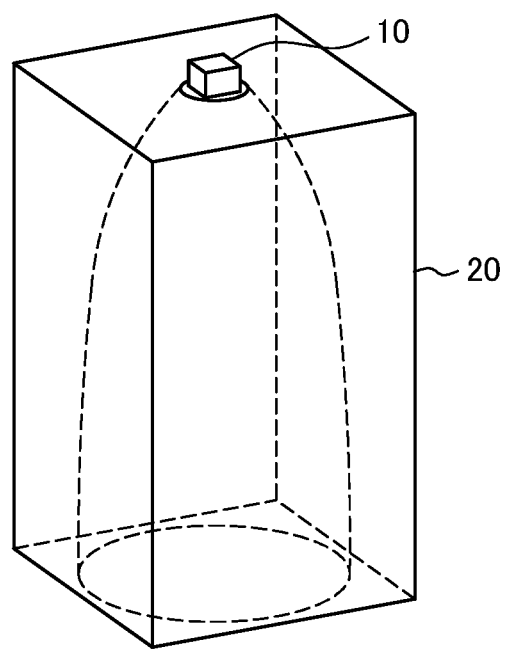
FIG. 9 is a perspective view in which the LED is disposed at the neck portion of the circular funnel shaped reflector.
Figure 10:
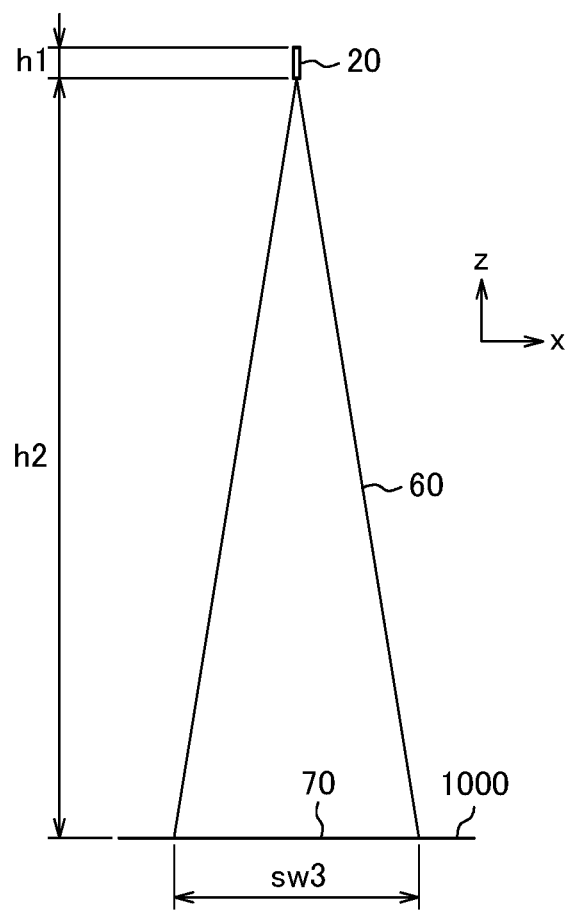
FIG. 10 is a model which shows a relation between the lighting device using the circular funnel shaped reflector and an irradiating surface.
Figure 10:
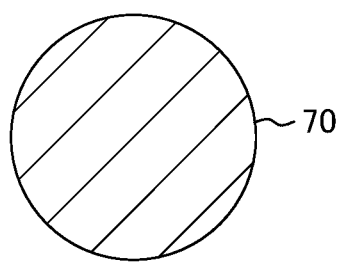

Herein after, the circular funnel shaped reflector 20 is assumed to have a structure of FIG. 5, in which the outer shape is rectangular and the inside is circular funnel shaped. FIG. 9 is a plan view in which the LED 10 as a light source is disposed at the neck portion located at the top of the circular funnel shaped reflector 20. FIG. 10 shows a light spot 70 on the floor 1000 when the lighting device of FIG. 9 illuminates the floor 1000 from a height of 2 m. In FIG. 10, h1 is a height of the lighting device and h2 is a distance between the lighting device and the floor.

In FIG. 10, item 60 is flux, item 70 is light spot, and sw3 is a diameter of the light spot. As shown in FIG. 10, the light from the light source expands according to light distribution angle and illuminates, as a light spot 70, the floor 1000. The circular shape, which is a shape of opening of the circular funnel shaped reflector 20, is maintained as a light spot 70.

Figure 11:
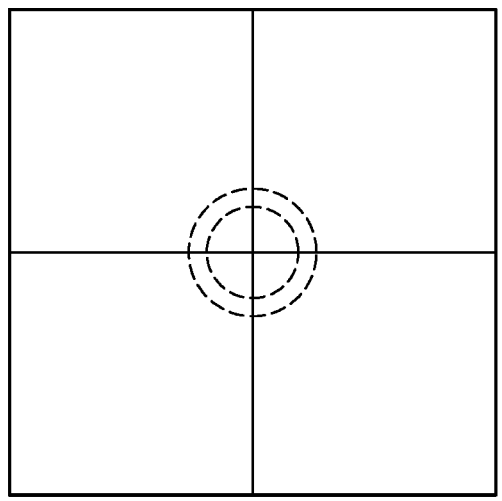
FIG. 11 is a relation between the shape of the light spot and the illuminance distribution when the lighting device of FIG. 9 is used.
Figure 11:
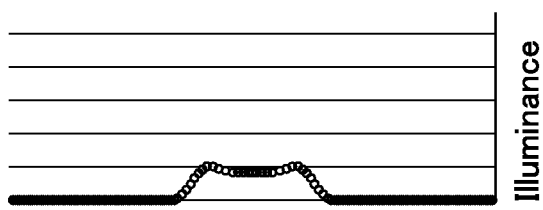

FIG. 11 is a shape of light spot and illuminance of the light spot when the lighting device of FIG. 9 is arranged as FIG. 10. Top figure of FIG. 11 shows a shape of light spot; bottom figure shows illuminance. In FIG. 11, the broken line is a contour of the light spot. In the graph of bottom figure, the abscissa is a location corresponding to the light spot of top figure; the ordinate shows illuminance.

Figure 12:
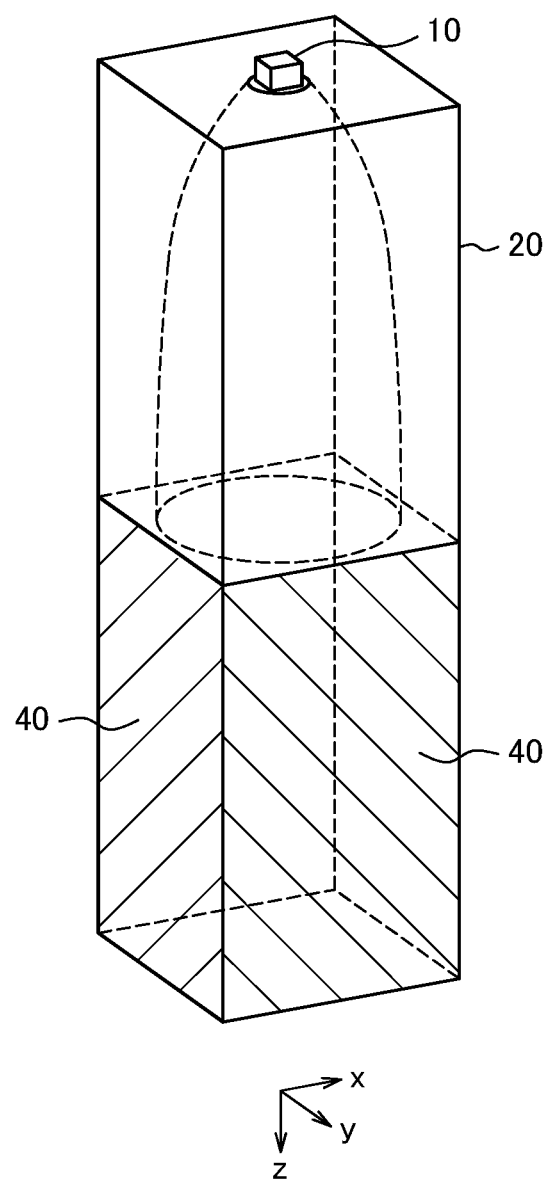
FIG. 12 is a perspective view in which the light shading plates are disposed at the opening of the circular funnel shaped reflector.

FIG. 12 is a perspective view in which the shading plates 40 are disposed at the opening of the circular funnel shaped reflector 20 of FIG. 9. In FIG. 12, the shading plates 40 extend in a direction perpendicular to the surface of opening of circular funnel shaped reflector 20, namely, in z direction. Therefore, the light spot from the light source gets closer to rectangle.

Figure 13:
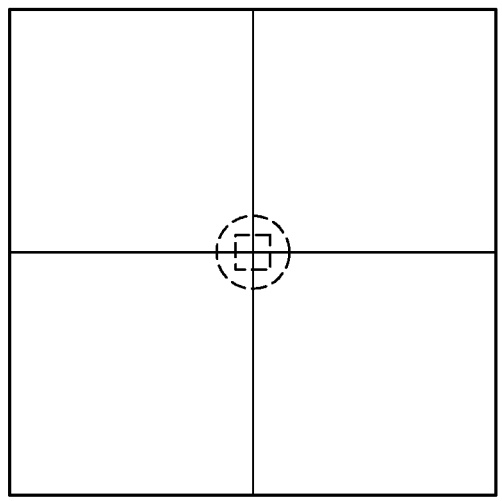
FIG. 13 is a relation between the shape of the light spot and the illuminance distribution when the lighting device of FIG. 12 is used.
Figure 13:
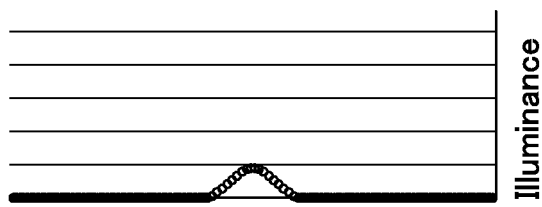

FIG. 13 is a shape of light spot and illuminance of the light spot at the floor 1000 when the lighting device of FIG. 12 is arranged as FIG. 10. In top figure of FIG. 13, a circular broken line shows a shape of light spot of original light source in which the light shading plates 40 are not disposed; a broken line of approximately rectangle is a light spot when the light shading plates 40 are used.

The graph of bottom figure of FIG. 13 shows an illuminance corresponding to rectangle light spot. As shown in FIG. 13, the peak value is the same as the peak value of FIG. 11. The light which can be utilized is an integrated value of illuminance of bottom graph. When the graph of illuminance of FIG. 11 and the graph of illuminance of FIG. 13 are compared with each other, the integrated value of the illuminance of FIG. 13 is smaller. That is to say, the shape of the light spot can be controlled by light shading plates 40, however, light utilizing efficiency decreases.

Figure 14:
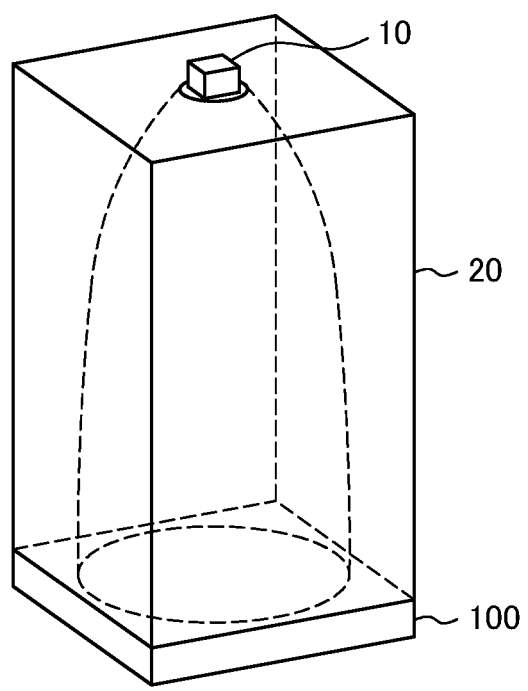
FIG. 14 is a perspective view when a liquid crystal lens is disposed at the opening of the circular funnel shaped reflector.
Figure 15:
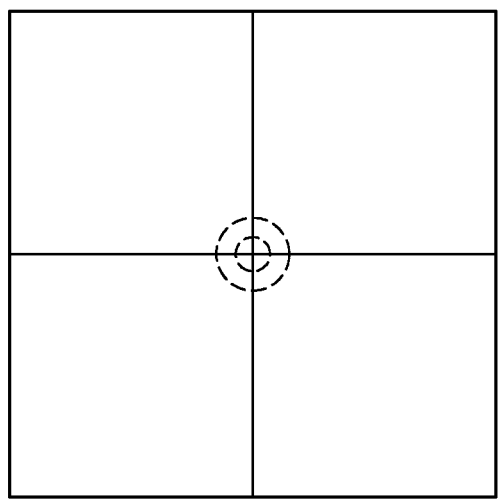
FIG. 15 is a relation between the shape of the light spot and the illuminance distribution when the lighting device of FIG. 14 is used and the liquid crystal lens is off.
Figure 15:
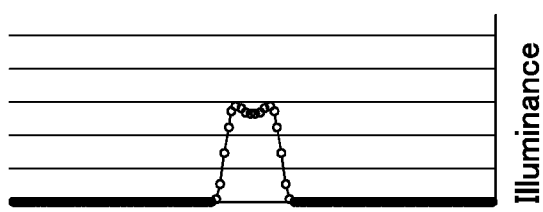
Figure 16:
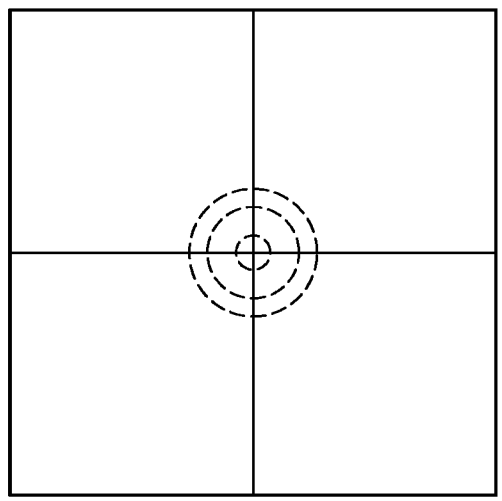
Figure 16:
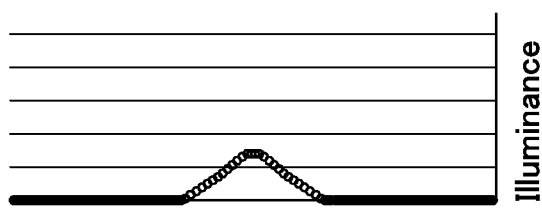

FIG. 14 is a perspective view of the lighting device when the shape of the light spot is changed by utilizing the liquid crystal lens 100. FIG. 15 and FIG. 16 show the effect of lighting device utilizing liquid crystal lens 100 shown in FIG. 14 to control the light spot. FIG. 15 and FIG. 16 correspond when the lighting device of FIG. 14 is arranged as FIG. 10.

FIG. 15 is a shape of light spot and illuminance distribution when the liquid crystal lens 100 shown in FIG. 14 is OFF, namely, when there is no effect of the liquid crystal lens 100. The broken lines in the top figure of FIG. 15 are contours of the light spot, while the bottom figure is a corresponding illuminance. FIG. 16 is a shape of the light spot and illuminance distribution when the liquid crystal lens 100 shown in FIG. 14 is made ON so that it works as a diffusion lens. The broken lines in the top figure of FIG. 16 are contours of the light spot and the bottom figure is a corresponding illuminance distribution.

A diameter of the light spot in FIG. 16 is larger than a diameter of the light spot in FIG. 15. On the other hand, the peak value of the illuminance in FIG. 16 is smaller than the peak value of the illuminance in FIG. 15. Instead, the diameter of the light pot in FIG. 16 is larger than the diameter of the light pot in FIG. 15. Since a lens strength of the liquid crystal lens 100 can be changed according to applied voltage to the liquid crystal lens 100, the shape and the illuminance distribution of the light spot can be changed rather easily. On the other hand, when the beam spot is changed by light shading plates 40, as shown in FIG. 12, it is necessary to change a tilting degree or a length of the light shading plates 40.

Figure 17:
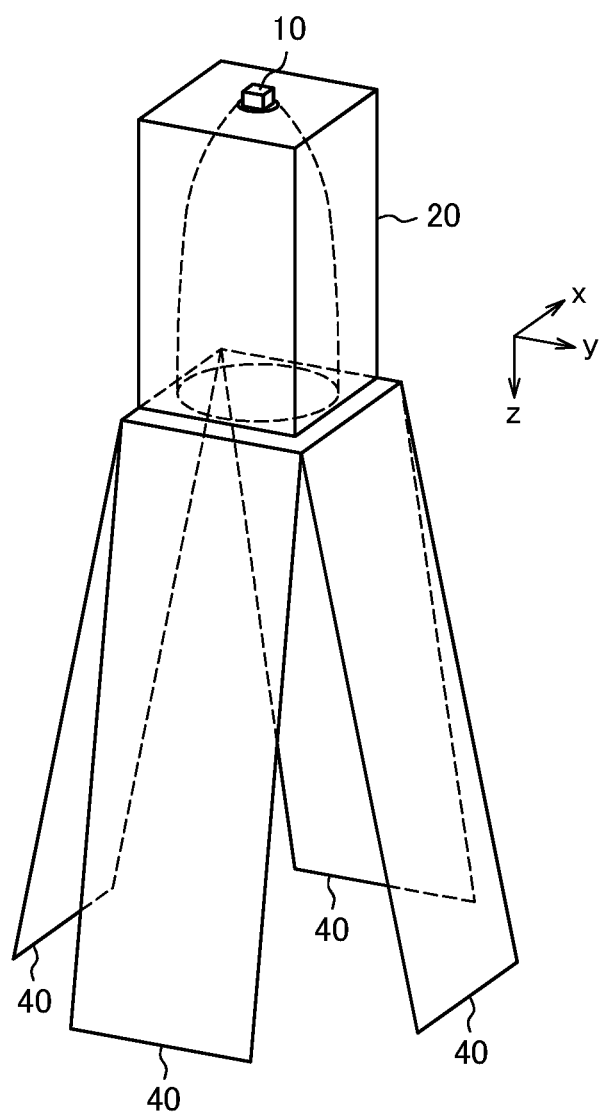
FIG. 17 is a perspective view of the lighting device in which four light shading plates open in angle.
Figure 18:
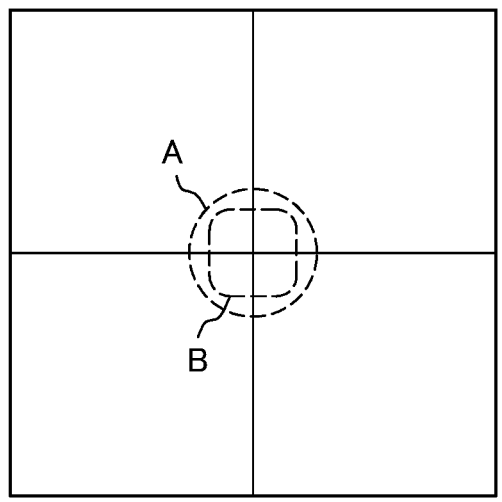
FIG. 18 is a relation between the shape of the light spot and the illuminance distribution when the lighting device of FIG. 17 is used.
Figure 18:
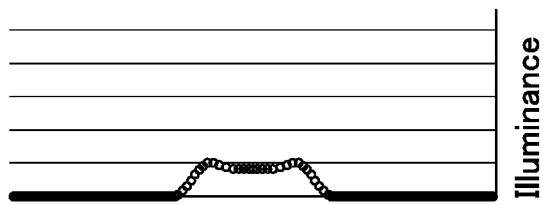

FIG. 17 and FIG. 18 are the case in which a size and a shape of the light spot are changed with the light shading plates 40. FIG. 17 is a perspective view, in which four light shading plates 40 are disposed with certain tilting angle to z axis at the opening of circular funnel shaped reflector 20. In FIG. 17, the light spot emitted from the opening of the circular funnel shaped reflector 20 is circular, however, the light spot at the irradiated surface is approximately rectangle due to influence of the light shading plates 40.

FIG. 18 is a shape of the light spot and the illuminance distribution when a lighting device of FIG. 17 is used. In the light spot in the top figure of FIG. 18, the circle A shown by broken line is a light spot when the light shading plates 40 are not used. The approximately rectangle B shown by broken line, which is inside of the circle, is a light spot when the light shading plates 40 are used. Since the light is absorbed at four sides by the light shading plates 40, the shape of the light spot gets closer to rectangle. Therefore, the light utilization efficiency decreases.

Figure 19:
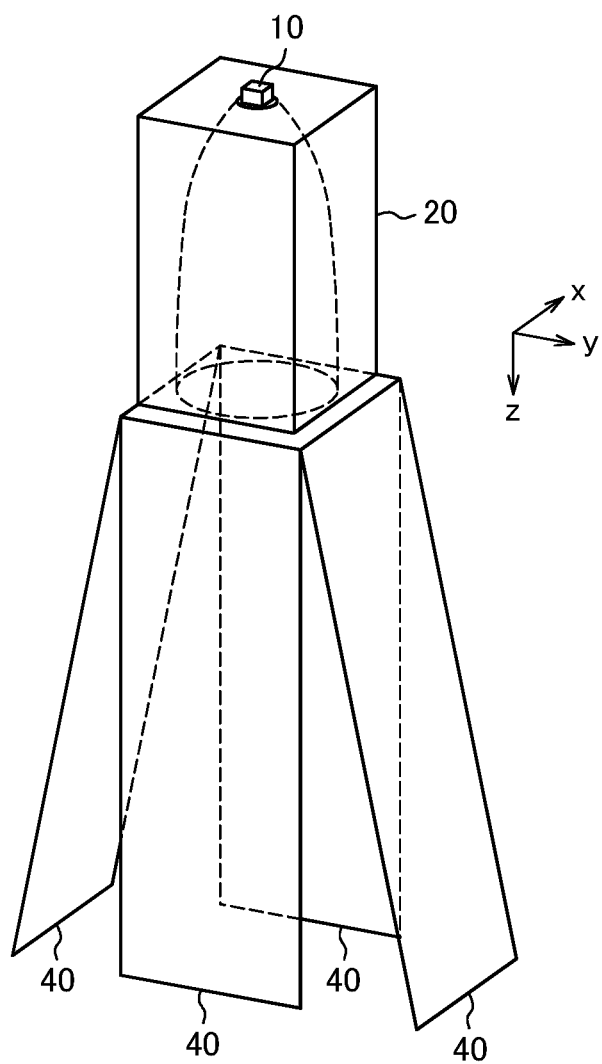
FIG. 19 is a perspective view of the lighting device in which two light shading plates open in angle.
Figure 20:
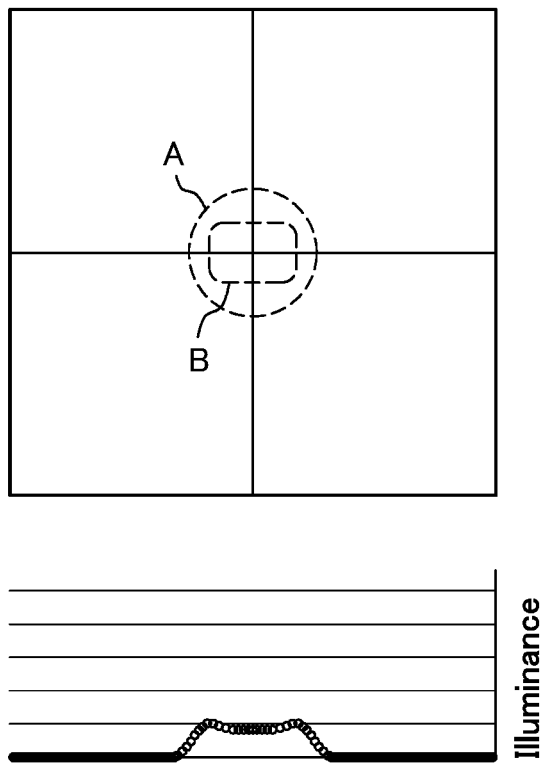
FIG. 20 is a relation between the shape of the light spot and the illuminance distribution when the lighting device of FIG. 19 is used.

FIG. 19 and FIG. 20 are the examples in which the shape and the aspect ratio of the light spot are changed with light shading plates 40. FIG. 19 is a perspective view of lighting device. Among the four light shading plates 40, disposed at the opening of circular funnel shaped reflector 20, opposing two light shading plates 40 extend in a direction perpendicular to the surface of the opening, namely, in z direction, however, other two light shading plates 40 extend from the opening surface with certain angle to z axis. Since the light absorbance is different according to azimuth of every 90 degrees in a plan view, the shape of the light spot becomes rectangle.

FIG. 20 is a shape of the light spot and illuminance distribution when a lighting device of FIG. 19 is used. In the light spot in the top figure of FIG. 20, the circle A shown by broken line is a light spot when the light shading plates 40 are not used. The approximately oblong B shown by broken line, which is inside of the circle, is a light spot when light shading plates 40 are used. Since the light is strongly absorbed at two sides by the light shading plates 40, the shape of the light spot gets closer to oblong. Therefore, the light utilization efficiency decreases.

Figure 21:
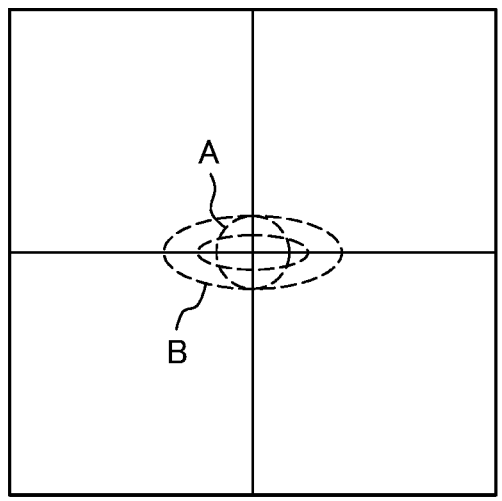
FIG. 21 is a relation between the shape of the light spot and the illuminance distribution when the lighting device of FIG. 14, which uses a liquid crystal lens, is used.
Figure 21:
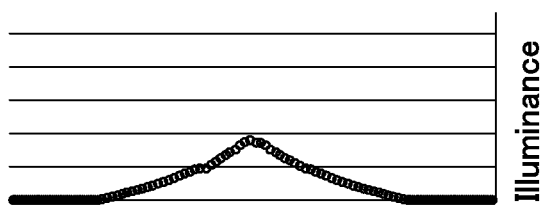

FIG. 21 is a shape of the light spot and the illuminance of the light spot when the liquid crystal lens 100 shown in FIG. 14 is used. The top figure of FIG. 21 shows a shape of light spot; the bottom figure shows the corresponding illuminance. In top figure of FIG. 21, the circle shown by broken line A is a light spot when the liquid crystal lens 100 is not used; the horizontally elongated ellipse shown broken line B is a light spot when the liquid crystal lens 100 is used.

In FIG. 21, in the liquid crystal 100, a divergent lens is formed in one direction, namely, in the lateral direction, a lens is not formed in the direction perpendicular to the one direction. Consequently, the shape of the light spot becomes a horizontally elongated ellipse. The bottom figure of FIG. 21 is a graph of the illuminance distribution corresponding to the elliptical light spot in the top figure of FIG. 21. The integrated value of illuminance in FIG. 21 is larger than that of FIGS. 18 and 20. The light utility efficiency is increased in FIG. 21 since a light absorbance by the shading plates 40 does not exist.

In addition, it is easy to change the shape of the light spot by changing a voltage applied to the liquid crystal lens 100 in the structure having a liquid crystal lens 100. On the other hand, it is not easy to change a shape of the light spot as e.g. from a circle to rectangle in the lighting device using a liquid crystal lens 100.

In the meantime, the present invention can use the rectangle funnel shaped reflector 30 as will be explained in FIG. 2. The shape of the opening of the rectangle funnel shaped reflector 30 is rectangle; and a shape of the light spot of the emitted light is rectangle. When the rectangle funnel shaped reflector 30 and the liquid crystal lens 100 are used, the rectangle light spot can be changed in various shapes. The effects are the same as explained in the case of circular funnel shaped reflector 20.

Embodiment 2

It is not easy to change a shape of the light spot as e.g. from a circle to rectangle in the lighting device using a liquid crystal lens 100. Embodiment 2 provides a lighting device which can easily change a shape of light spot. For that purpose, embodiment 2 uses a rectangle funnel shaped reflector 30 in addition to a circular funnel shaped reflector 20.

Figure 22:
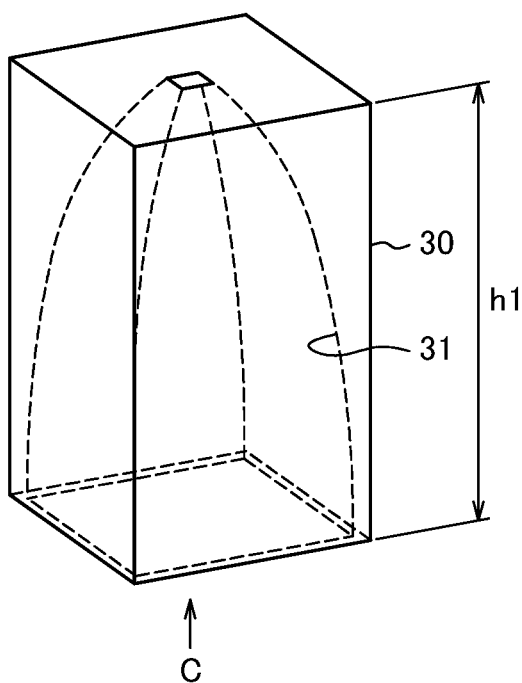
FIG. 22 a perspective view of a rectangle funnel shaped reflector.

FIG. 22 is a perspective view of rectangle funnel shaped reflector 30. In the rectangle funnel shaped reflector 30, at least a part of the inner surface is paraboloid, however, the opening is rectangle. In the structure of FIG. 22, the concave portion can be formed by machining the metal block of high reflectivity as aluminum. Alternatively, the rectangle funnel shaped reflector 30 can be formed by die cast. In addition, as explained in embodiment 1, the rectangle funnel shaped reflector 30 can be formed by resin with injection molding; the metal having high reflectance as aluminum or silver is coated on the inner surface by vacuum evaporation, sputtering or plating to form a reflecting surface 31.

Figure 23:
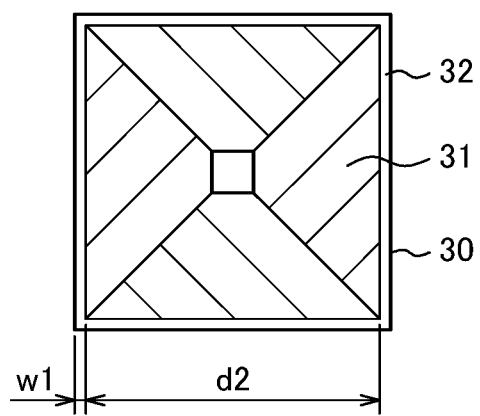
FIG. 23 is a bottom view of the rectangle funnel shaped reflector.

FIG. 23 is a bottom view which the rectangle funnel shaped reflector 30 of FIG. 23 is viewed from direction C. In FIG. 23, item 31 is a reflecting surface and item 32 is a bottom surface. If it is formed by metal, a mechanical strength of the rectangle funnel shaped reflector 20 can be maintained when a width w1 at the bottom of FIG. 23 is approximately 0.2 mm. The shape of FIG. 23 is easy to handle since the outer shape is rectangular. In addition, when a plurality of lighting devices as FIG. 23 are used side by side, it is easy to arrange the lighting devices because the outer shape is rectangular.

In order to make the light distribution angle small, a ratio of a height h1 and a length of one side d2 should be large in the rectangle funnel shaped reflector 30, too. The ratio of h1/d2 is 2 or larger, preferably 3 or larger, further more preferably 4 or larger. When the shape of the opening is rectangle, d2 corresponds to longer side.

Figure 24:
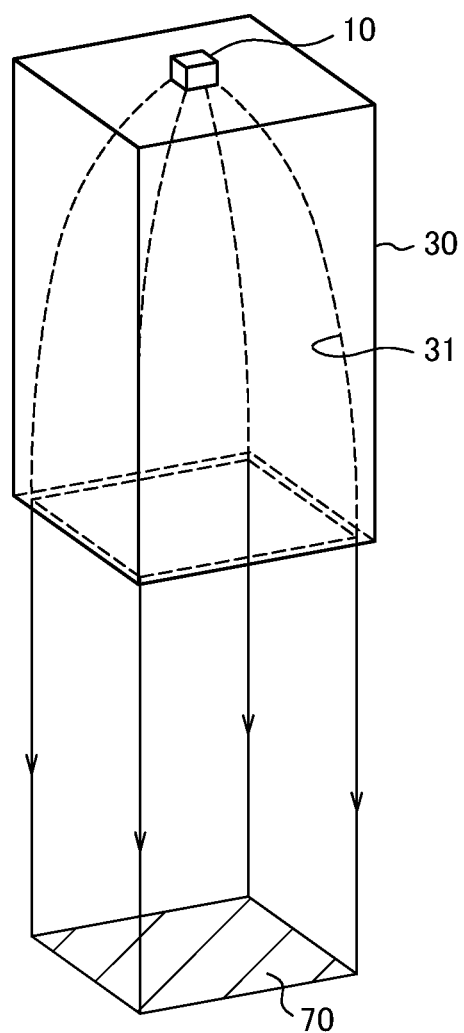
FIG. 24 is a perspective view of the light spot when the rectangle funnel shaped reflector.

FIG. 24 is a perspective view to show a light spot 70 emitted from the rectangle funnel shaped reflector 30. In FIG. 24, the LED 10 as the light source is located at the neck portion located at the top of the rectangle funnel shaped reflector 30. Since at least a part of the reflecting surface 31 is paraboloid, the emitted light spot 70 maintains rectangle as the shape of the opening.

Figure 25:
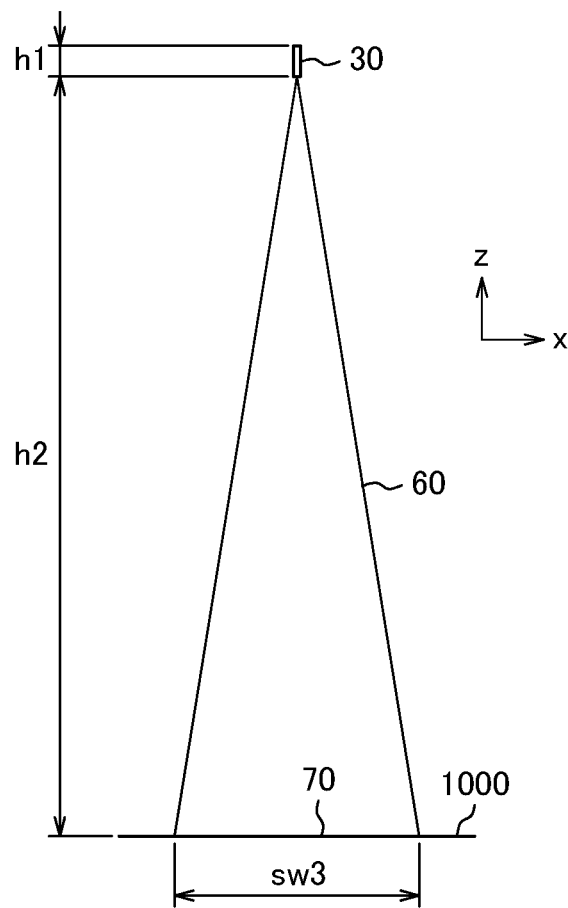
FIG. 25 is a model which shows a relation between the lighting device using the rectangle funnel shaped reflector and an irradiating surface.
Figure 25:
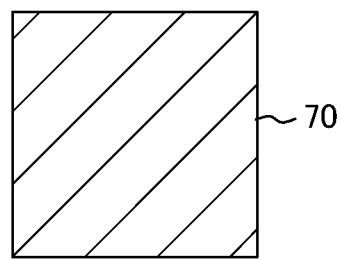

FIG. 25 shows a light spot 70 on the floor 1000 when the lighting device of FIG. 24 illuminates the floor 1000 from a height of 2 m. In FIG. 25, h1 is a height of the lighting device 30, and h2 is a distance between the lighting device 30 and the floor 1000. Other structures of FIG. 25 are the same as explained in FIG. 10. The rectangle funnel shaped reflector 30 of FIG. 24 has a light distribution angle of 10 degrees or less; thus, the shape of the light spot 70 at the floor 1000 maintains a rectangle.

Figure 26:
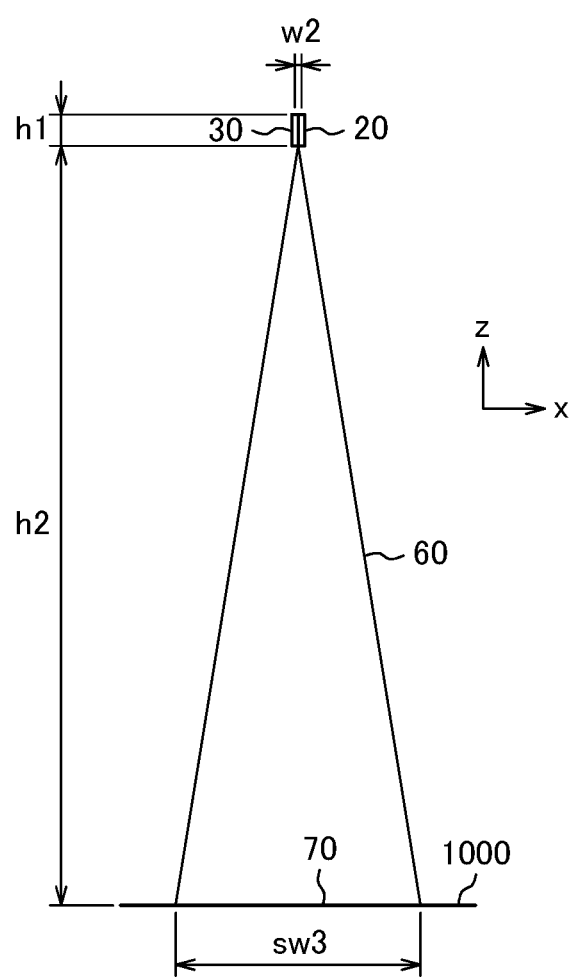
FIG. 26 is a relation between the shape of the light spot and the illuminance distribution when two funnel shaped reflectors are used.

FIG. 26 is a model for explanation when the circular funnel shaped reflector 20 and the rectangle funnel shaped reflector 30 are juxtaposed as the light source. In FIG. 26, a distance w2 between the centers of the circular funnel shaped reflector 20 and the rectangle funnel shaped reflector 30 is e.g. 7 mm; on the other hand, the distance from the lighting devices of 20 and 30 to the floor 1000 is 2 m, which is much larger than w2. Therefore, a position of the light spot 70 at the floor 1000 is almost not changed between the case when the light source is the circular funnel shaped reflector 20 and the case when the light source is the rectangle funnel shaped reflector 30. The difference is whether light spot 70 becomes rectangle of circle.

Figure 27:
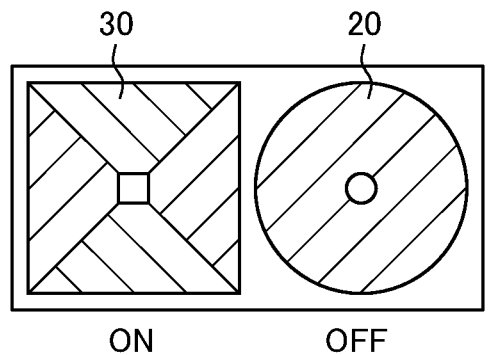
FIG. 27 is a relation between the shape of the light spot and the illuminance distribution when the rectangle funnel shaped reflectors are turned on in the lighting device which has the circular funnel shaped reflectors and the rectangle funnel shaped reflectors.
Figure 27:
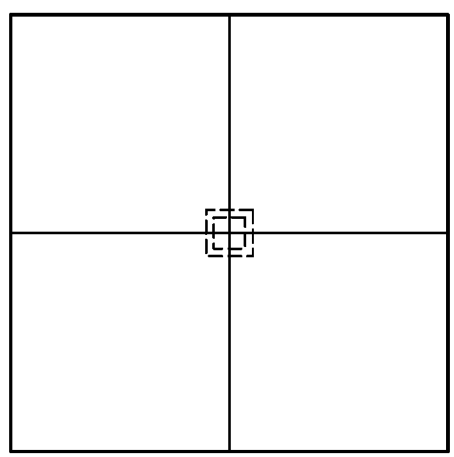
Figure 27:
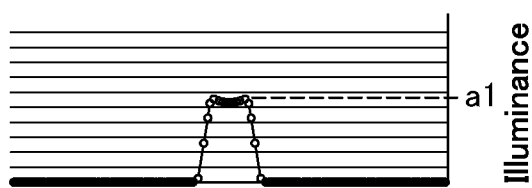

FIG. 27 shows a shape of the light spot when the circular funnel shaped reflector 20 and the rectangle funnel shaped reflector 30 are juxtaposed as the light source, but only the rectangle funnel shaped reflector 30 is turned on. The top figure of FIG. 27 is a bottom view of the rectangle funnel shaped reflector 30 and the circular funnel shaped reflector 20; the center figure of FIG. 27 is a shape of light spot; the bottom view of FIG. 27 is a graph of illuminance distribution corresponding the light spot. The light spot shown by broken line in FIG. 27 is rectangle.

Figure 28:
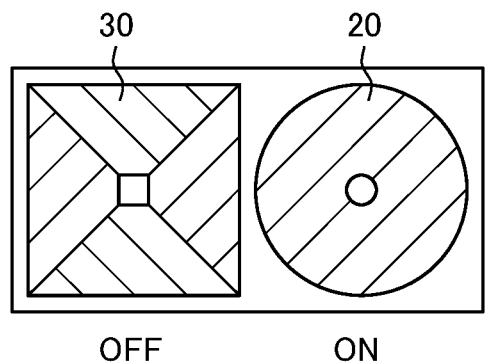
FIG. 28 is a relation between the shape of the light spot and the illuminance distribution when the circular funnel shaped reflectors are turned on in the lighting device which has the circular funnel shaped reflectors and the rectangle funnel shaped reflectors.
Figure 28:
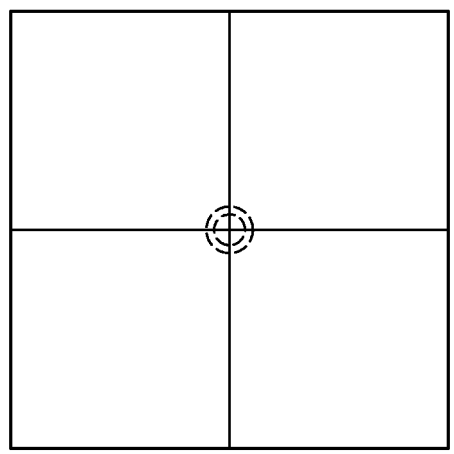
Figure 28:
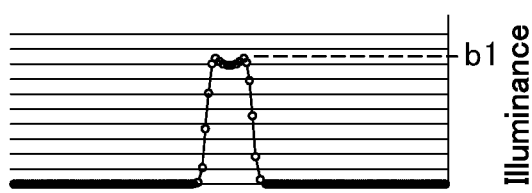

FIG. 28 is a shape of light spot when the same light source as FIG. 27 is used, but only the circular funnel shaped reflector 20 is turned on. The top figure in FIG. 28 is the same as the top figure in FIG. 27; the center figure in FIG. 28 is a shape of the light spot; the bottom figure of FIG. 27 is a graph of illuminance distribution corresponding the light spot. The light spot shown by broken line in FIG. 28 is circular.

As described above, when the structure of FIGS. 26 to 28 are used, a shape of light spot can be switched easily between a circular light spot and a rectangle light spot. In addition, outer sizes of the circular funnel shaped reflector 20 and the rectangle funnel shaped reflector 30 are very small, therefore they are easy to be juxtaposed.

If the illuminance is not enough when one circular funnel shaped reflector 20 and one rectangle funnel shaped reflector 30 are used as shown on FIGS. 27 and 28, a plurality light sources can be used. As shown in FIG. 6, a width of the funnel shaped reflector 20 or 30 is small enough compared with a distance between the light source 20, 30 and the floor 1000, therefore, a position of the light spot is not essentially changed; and only an illuminance of the light spot is changed.

Figure 29:
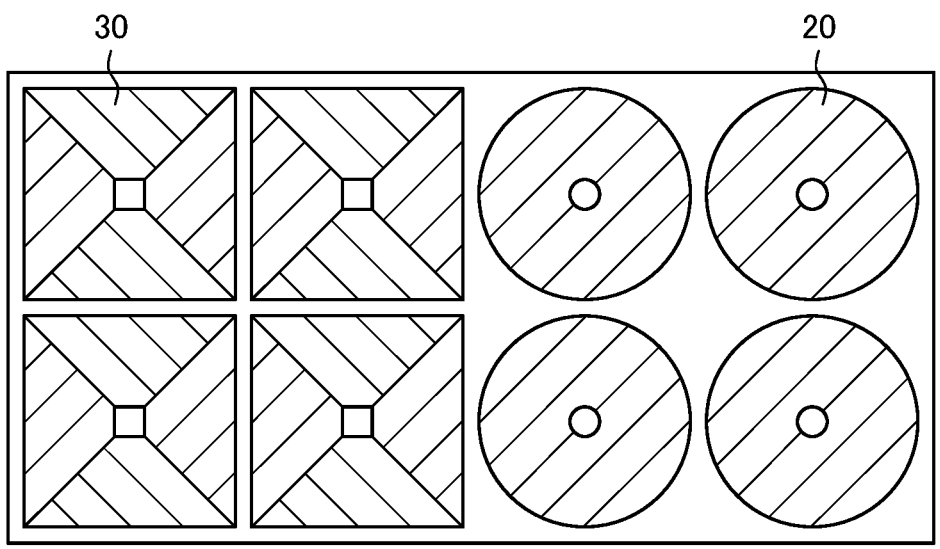
FIG. 29 is a plan view in which four circular funnel shaped reflectors and four rectangle funnel shaped reflectors are disposed.
Figure 30:
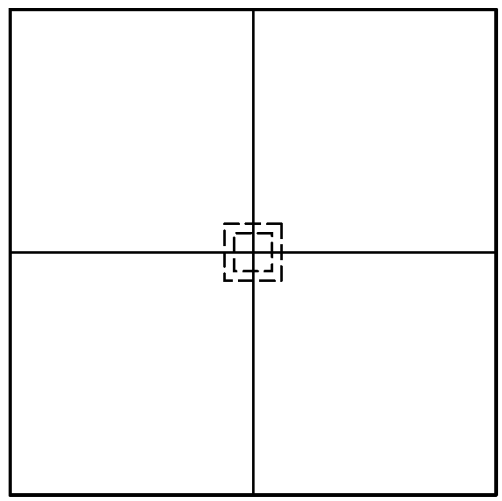
FIG. 30 is a relation between the shape of the light spot and the illuminance distribution when the rectangle funnel shaped reflectors are turned on in the lighting device of FIG. 29.
Figure 30:
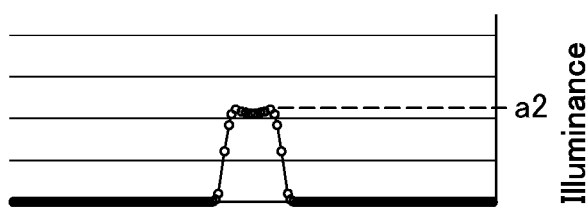

FIG. 29 is a plan view in which a set of four rectangle funnel shaped reflectors 30 arranged in square and another set of four circular funnel shaped reflectors 20 arranged in square are juxtaposed. FIG. 30 shows light spot when only four rectangle funnel shaped reflectors 30 in FIG. 29 are turned on. In FIG. 30, although the shape of light spot is approximately rectangle, which is not much different from the light spot of FIG. 27, the corresponding illuminance a2, however, is approximately 4 times larger than the illuminance a1 of FIG. 27.

Figure 31:
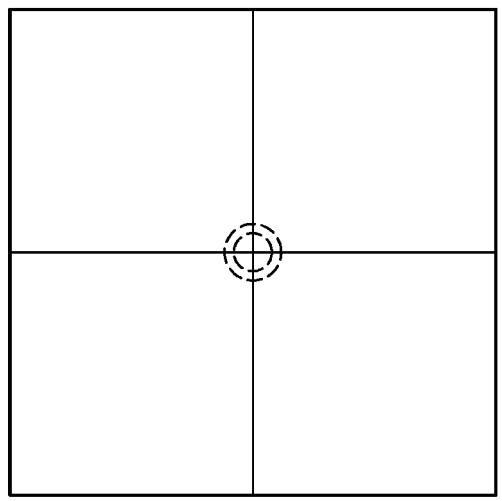
FIG. 31 is a relation between the shape of the light spot and the illuminance distribution when the circular funnel shaped reflectors are turned on in the lighting device of FIG. 29.
Figure 31:
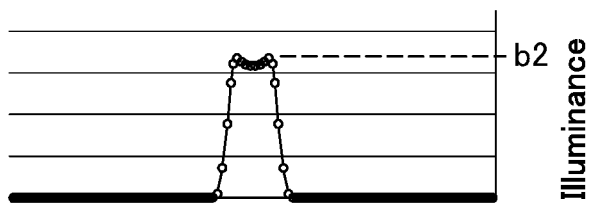

FIG. 31 shows light spot when only four circular funnel shaped reflectors 20 in FIG. 29 are turned on. In FIG. 31, although the shape of light spot is approximately circular, which is not much different from the light spot of FIG. 28, the corresponding illuminance b2, however, is approximately 4 times larger than the illuminance b1 of FIG. 28.

Figure 32:
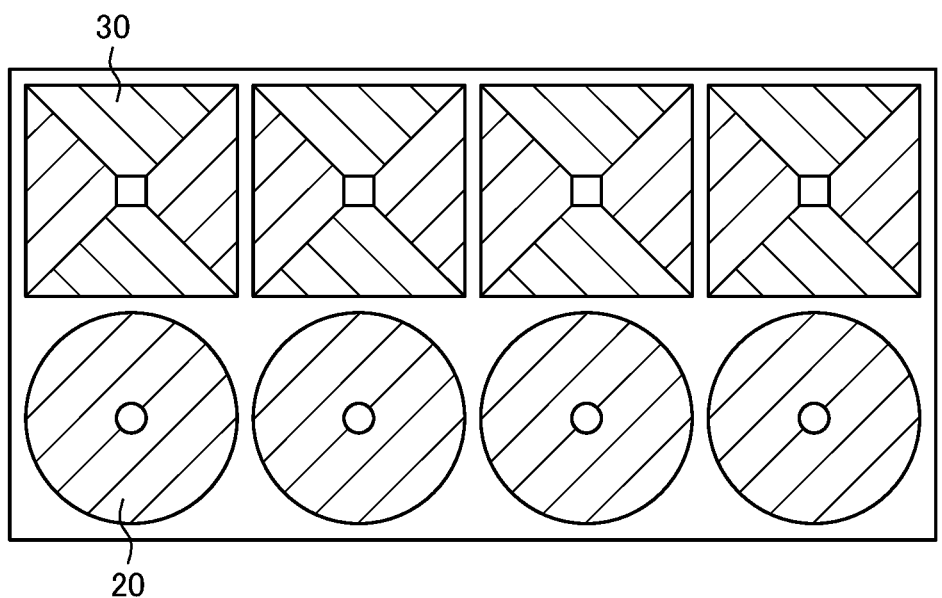
FIG. 32 is a plan view in which four circular funnel shaped reflectors and four rectangle funnel shaped reflectors are disposed with a different arrangement.
Figure 32:
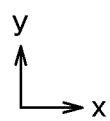

FIG. 32 is a plan view in which a set of four rectangle funnel shaped reflectors 30 arranged inline in x direction and another set of four circular funnel shaped reflectors 20 arranged inline in x direction are juxtaposed in y direction. In this case also a rectangle light spot is formed when only rectangle funnel shaped reflectors 30 are turned on; a circular light spot is formed when only circular funnel shaped reflectors 20 are turned on. The shape of the light spot and corresponding illuminance distribution are theoretically the same as explained for FIGS. 30 and 31.

Figure 33:
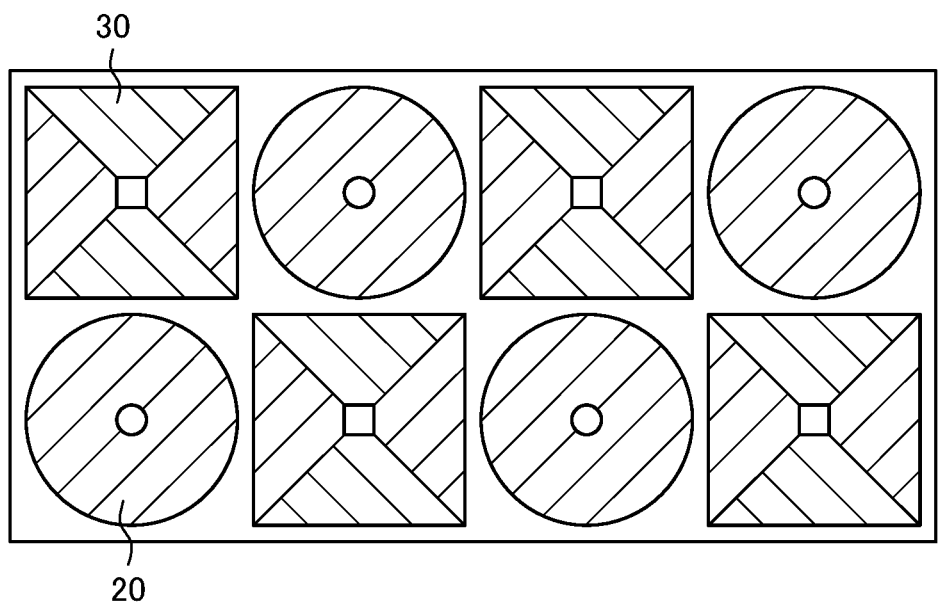
FIG. 33 is a plan view in which four circular funnel shaped reflectors and four rectangle funnel shaped reflectors are disposed with a further different arrangement.

FIG. 33 is a plan view in which the rectangle funnel shaped reflectors 30 and the circular funnel shaped reflectors 20 are alternatively disposed four in x direction and two in y direction. In this case too, a rectangle light spot is formed when only the rectangle funnel shaped reflectors 30 are turned on, and a circular light spot is formed when only the circular funnel shaped reflectors 20 are turned on. The shape of the light spot and corresponding illuminance distribution are theoretically the same as explained for FIGS. 30 and 31.

FIGS. 29 to 33 are examples when either the circular funnel shaped reflector 20 or the rectangle funnel shaped reflector 30 is turned on. If necessary, however, a mixture of a rectangle light spot and a circular light spot can be formed when the circular funnel shaped reflector 20 and the rectangle funnel shaped reflector 30 are simultaneously turned on. In this case, light spots of various illuminance distribution can be formed by changing the number of lighted circular funnel shaped reflectors 20 and lighted rectangle funnel shaped reflectors 30.

The lighting devices of FIGS. 27 to 33 can be formed by various method as: the circular funnel shaped reflector 20 and the rectangle funnel shaped reflector 30 are separately formed and juxtaposed; or the circular funnel shaped reflector 20 and the rectangle funnel shaped reflector 30 are simultaneously formed in the common metal block; or alternatively, a pair block of the circular funnel shaped reflector 20 and the rectangle funnel shaped reflector 30 are formed, then form a lighting device having four or larger funnel shaped reflectors 20 and 30.

If the liquid crystal lens 100 is used at each of the openings of a combination of the circular funnel shaped reflector 20 and the rectangle funnel shaped reflector 30 shown in FIGS. 27, 28, 29, 32, 33 and so on, more detailed control of the shape of the light spot can be performed. In this case, the liquid crystal lens 100 is formed in common to plurality of the circular funnel shaped reflectors 20 and the rectangle funnel shaped reflectors 30, and individual liquid crystal lens 100 is formed corresponding to individual funnel shaped reflectors 20 and 30.

Embodiment 3

Figure 34:
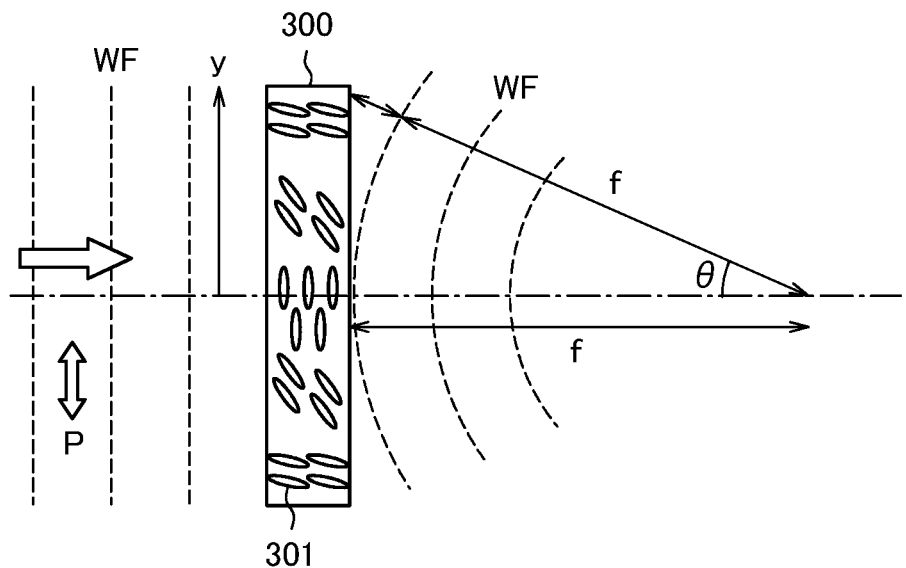
FIG. 34 is an example that a convex lens is formed by the liquid crystal lens.

Embodiment 3 shows examples of liquid crystal lens 100 used in embodiment 1 and embodiment 2. FIG. 34 is a cross sectional view which shows function of a liquid crystal lens 100. In FIG. 34, collimated light enters a liquid crystal layer 300 from left hand side. P in FIG. 34 means a polarized direction of impinging light. Generally, the polarized direction of normal light distributes randomly, however, the liquid crystal has an anisotropy in refraction; therefore, FIG. 34 shows a function of the liquid crystal layer 300 to the light polarized in P direction.

In FIG. 34, liquid crystal molecules 301 align as that a tilting angle becomes larger in going to periphery of the liquid crystal layer 300 due to electrical field from the electrodes. A liquid crystal molecule 301 has an elongated shape; effective refractive index in the long axis is larger than effective refractive index in the short axis in the liquid crystal molecule 301; therefore, refractive index in the liquid crystal layer 300 becomes larger in going to periphery, thus, a convex lens is formed. In FIG. 34, the broken line is a light wave front WF, and f is a focus distance.

Figure 35:
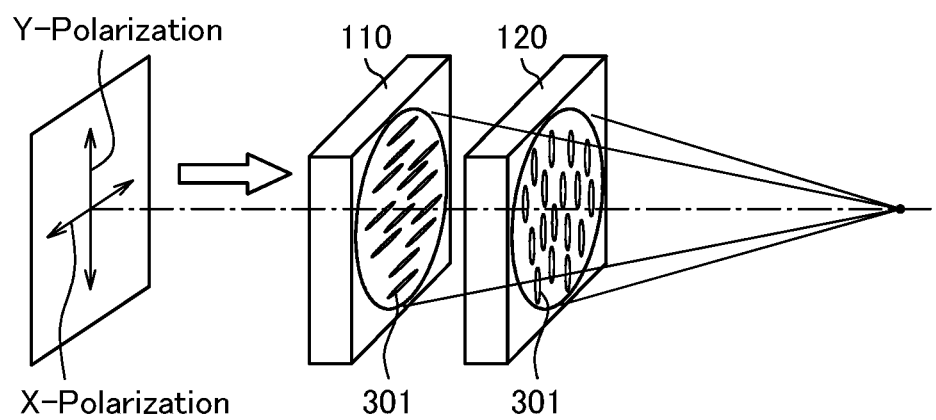
FIG. 35 is a perspective view of a lens system in which two liquid crystal lenses are used.

Liquid crystal has refractive index anisotropy; therefore, a second lens, which works on the light polarized in orthogonal direction to the polarized direction of light on which the first lens works, is necessary. FIG. 35 is an exploded perspective view of this lens structure. In FIG. 35, the parallelogram in left hand side is the wave front of light. In FIG. 35, the light polarized in x direction and the light polarized in y direction light enter the liquid crystal layer 300. The first liquid crystal lens 110 works on the light polarized in x direction; the second liquid crystal lens 120 works on the light polarized in y direction.

In FIG. 35, initial alignment directions of the liquid crystal molecules 301 are orthogonal between in the first liquid crystal lens 110 and the second liquid crystal lens 120. The initial alignment direction of the liquid crystal molecule 301 is determined by alignment direction of the alignment film formed in the liquid crystal lens. That is to say, the alignment directions of the alignment films of the substrates on the side from which the light enters from outside in two liquid crystal lenses, are orthogonal to each other between two liquid crystal lenses.

Figure 36:
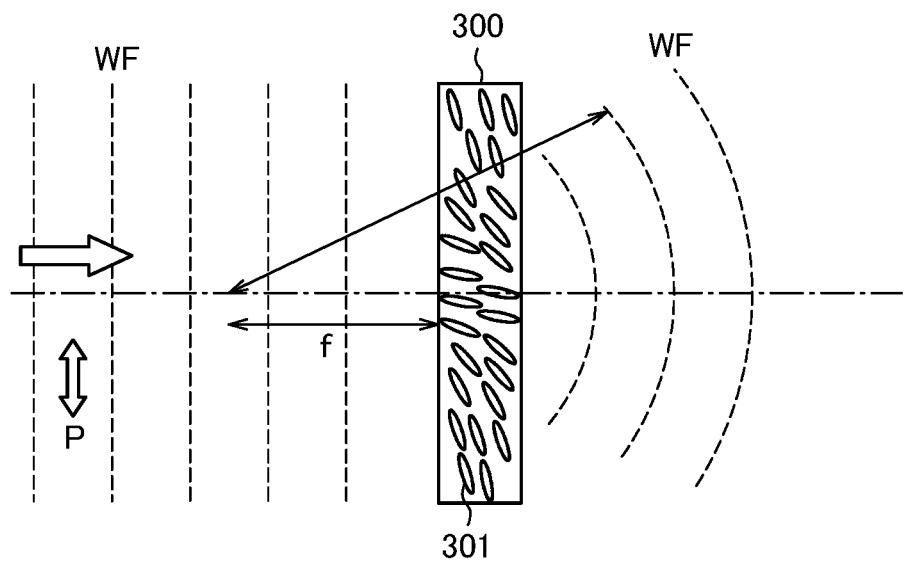
FIG. 36 is an example that a concave lens is formed by the liquid crystal lens.

FIG. 36 shows to form a concave lens by liquid crystal lens. In FIG. 36, the light having the wave front WF, which is parallel to the liquid crystal layer 300, and polarized in one direction enters the liquid crystal layer 300 from left hand side. In FIG. 36, the liquid crystal molecules 301 align as that the tilting angle becomes smaller in going to periphery of the liquid crystal layer 300 due to electrical field from the electrodes. Due to the above lens structure, the wave front WF of light, which has passed the liquid crystal layer 300, becomes a curve as shown by broken line in FIG. 36, thus, concave lens is formed. In the meantime, in the case of concave lens also, two liquid crystal lenses are necessary as explained in FIG. 35.

Figure 37:
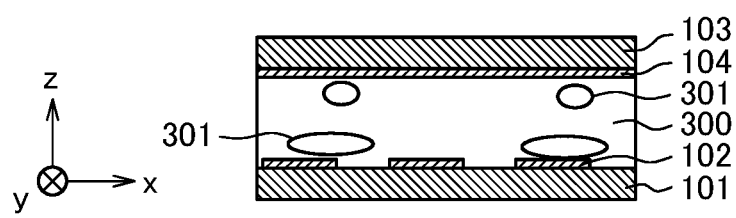
FIG. 37 is a cross sectional view of liquid crystal lens according to first example.

FIG. 37 is a cross sectional view of a first example of actual structure of the liquid crystal lens 100. In FIG. 37, the first electrode 102 is formed on the first substrate 101, the second electrode 104 is formed on the second substrate 103, and the liquid crystal layer 300 is sandwiched between the first substrate 101 and the second substrate 103. Alignment films are formed over the first electrode 102 and the second electrode 104; however, alignment films are omitted in FIG. 37. It is the same in other figures. The initial alignment directions of the liquid crystal molecules 301 are determined by alignment treatment, as rubbing process and the like, to the alignment film.

In FIG. 37, the initial alignment direction of the liquid crystal molecules 301 on the first substrate 101 side and the initial alignment direction of the liquid crystal molecules 301 on the second substrate 103 side are orthogonal to each other, namely, it is a so called TN (Twisted Nematic) type liquid crystal lens. The first electrode 102 extends in x direction and the second electrode 104 extends in y direction. However, forming the liquid crystal lens 100 in the present invention is not limited to TN type liquid crystal.

Figure 38:
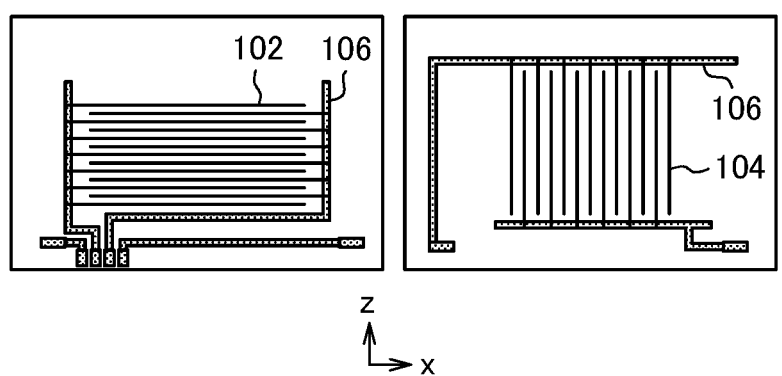
FIG. 38 is a plan views of first electrodes and second electrodes of the liquid crystal lens according to example 1.

The figure of left hand side of FIG. 38 is a plan view of the first electrode 102 formed on the first substrate 101. The figure of right hand side of FIG. 38 is a plan view of the second electrode 104 formed on the second substrate 103. The first electrodes 102 extend in x direction; the second electrodes 104 extend in y direction. The liquid crystal molecules 301 align according to voltage at a cross point of the first electrode 102 and the second electrode 104. That is to say, various functions of liquid crystal lens can be performed by voltages applied to the first electrode 102 and the second electrode 104.

Figure 39:
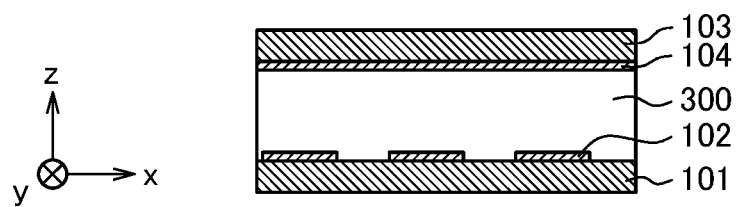
FIG. 39 is a cross sectional view of the liquid crystal lens according to second example.
Figure 40:
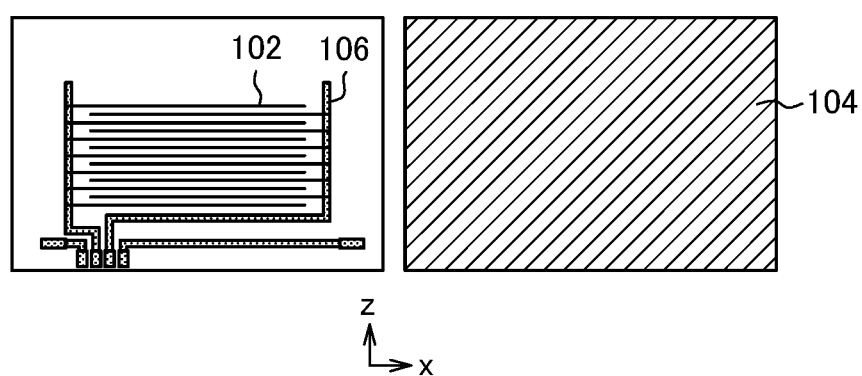
FIG. 40 is a plan views of the first electrodes and the second electrodes of the liquid crystal lens according to example 2.

FIG. 39 is a cross sectional view of a second example of actual structure of the liquid crystal lens 100. In FIG. 39, the first electrode 102 of stripe is formed on the first substrate 101, the second electrode 104 of stripe is formed on the second substrate 103, and the liquid crystal layer 300 is sandwiched between the first substrate 101 and the second substrate 103. The figure of left hand side of FIG. 40 is a plan view of the first electrode 102 formed on the first substrate 101; the first electrode extends in x direction. The figure of right hand side of FIG. 40 is a plan view of the second electrode 104 formed on the second substrate 103; the second electrode 104 is plane shaped. Second example also, as first example, various functions of liquid crystal lens can be performed by voltages applied to the first electrode 102 and the second electrode 104.

The above explained structures of the liquid crystal lens are examples; the liquid crystal lens can be realized by other structures. When the light spot is controlled by the liquid crystal lens, finer control can be performed if light distribution angle of the light incident to the lens is small. The circular funnel shaped reflector 20 of FIG. 5 is used in embodiment 1, and the rectangle funnel shaped reflector 30 of FIG. 21 is used in embodiment 2 in combination with the liquid crystal lens 100. Since the circular funnel shaped reflector 20 and the rectangle funnel shaped reflector 30 can provide an incident light of small light distribution angle, a fine control in a shape of light spot and a fine control in an illumination distribution can be realized according to the present invention.

What is claimed is:

1. A lighting device comprising:
a circular funnel shaped reflector including a first neck portion, a circular opening portion, a first reflecting surface, and a first optical axis,
a rectangle funnel shaped reflector including a second neck portion, a rectangle opening portion, a second reflecting surface, and a second optical axis,
provided a distance from the first neck portion to the circular opening portion along the first optical axis is h1, and a diameter of the circle is d1,
h1/d1 is two or larger,
provided a distance from the second neck portion to the rectangle opening portion along the second optical axis is h2, and a length of one side of the rectangle is d2,
h2/d2 is two or larger, and
the circular funnel shaped reflector and the rectangle funnel shaped reflector are disposed adjacently.

2. The lighting device according to claim 1,
wherein the circular funnel shaped reflector is formed in a concave of a first rectangular, and
the rectangle funnel shaped reflector is formed in a concave of a second rectangular.

3. The lighting device according to claim 1
wherein an outer size of the first rectangular and an outer size of the second rectangular are the same.

4. The lighting device according to claim 1
wherein at least a part of a cross section of the circular funnel shaped reflector along the first optical axis is parabolic, and
at least a part of a cross section of the rectangle funnel shaped reflector along the second optical axis is parabolic.

5. The lighting device according to claim 1
wherein a plurality of the circular funnel shaped reflectors exist, and a plurality of the rectangle funnel shaped reflectors exist.

6. The lighting device according to claim 1 wherein the circular funnel shaped reflector and the rectangle funnel shaped reflector are formed in a common rectangular metal block.

7. The lighting device according to claim 1, wherein a single panel of a liquid crystal lens is disposed at the circular opening of the circular funnel shaped reflector and the rectangle opening of the rectangle funnel shaped reflector, and, the single panel of a liquid crystal lens forms a liquid crystal lens for each of the circular funnel shaped reflector and the rectangle funnel shaped reflector.

* * * * *